United States Patent
Kamm et al.

[15] 3,683,592
[45] Aug. 15, 1972

[54] INHIBITION OF POLYMERIZATION ON MOLECULAR SIEVES

[72] Inventors: Gerard R. Kamm, South Charleston; Charles H. Young, Charleston, both of W. Va.

[73] Assignee: Union Carbide Corporation

[22] Filed: Feb. 27, 1964

[21] Appl. No.: 347,672

[52] U.S. Cl. ..................55/75, 55/389, 252/404, 252/407, 252/428, 252/449, 260/677 AD
[51] Int. Cl. ..............................B01d 53/02
[58] Field of Search...............260/677 A; 55/75, 389; 252/407, 404, 428, 449

[56] References Cited

UNITED STATES PATENTS

| | | | |
|---|---|---|---|
| 2,119,114 | 5/1938 | Richardson et al. | 252/407 |
| 2,272,205 | 2/1942 | Hughes | 252/407 |
| 2,371,333 | 3/1945 | Johnston | 252/407 |
| 2,535,058 | 12/1950 | Gleim et al. | 252/407 |
| 2,805,190 | 9/1957 | Monroe et al. | 252/407 |
| 2,993,903 | 7/1961 | Kraus | 252/407 |
| 3,010,810 | 11/1961 | Strayner et al. | 252/407 |
| 3,019,097 | 1/1962 | Ecke et al. | 252/407 |
| 3,106,593 | 10/1963 | Bensei et al. | 260/677 |
| 3,209,050 | 9/1965 | Hanson | 260/681.5 |

FOREIGN PATENTS OR APPLICATIONS

| | | | |
|---|---|---|---|
| 595,948 | 4/1960 | Canada | 260/677 |
| 1,119,252 | 12/1961 | Germany | 260/677 |
| 1,301,684 | 7/1962 | France | 260/677 |

*Primary Examiner*—John Adee
*Attorney*—Paul A. Rose, Louis C. Smith and Francis M. Fazio

[57] ABSTRACT

Molecular sieves are treated with organic compounds containing oxygen (in the form of a hydroxyl group or an ether linkage) to inhibit the ability of the molecular sieve to catalyze the polymerization of polymerizable unsaturated hydrocarbons, such as isobutylene, isoprene, butadiene, vinyl-acetylene and the like.

44 Claims, No Drawings

INHIBITION OF POLYMERIZATION ON MOLECULAR SIEVES

This invention relates to the separation of components from hydrocarbon streams containing a polymerizable unsaturated hydrocarbon. More particularly, this invention relates to a method for treating molecular sieves with certain organic, oxygen-containing compounds to inhibit the ability of the sieve to catalyze the polymerization of polymerizable unsaturated hydrocarbons.

As is known, molecular sieves are crystalline natural or synthetic zeolites which, in an anhydrous form, comprise a three-dimensional silica-alumina network containing pores or interstices or molecular dimensions within the lattice. In addition to silica and alumina, the zeolites contain one or more metal cations, such as sodium, potassium, calcium, strontium or barium cations, which determine the diameter of the pores. For each zeolite composition the narrowest cross-sectional diameter of the pores, or "pore size", is a characteristic of the material and is substantially uniform throughout the crystal. For example, there are presently commercially available molecular sieves having pore sizes of 3 4, 5, 8 and 9 Angstroms, denominated as Types 3A, 4A, 5A, 10X and 13X, respectively. These sieves and their method of production are more fully described in U.S. Pat. Nos. 2,882,243 and 2,882,244 to R.M. Milton, the disclosures of which are incorporated herein by reference. Other types of molecular sieves will readily occur to those skilled in the art.

It is further known that molecular sieves can be employed to separate various components present in gases or liquids according to the diameter or configuration of the molecules of the components, the degree of unsaturation of the molecules, or their polarity. For example 5A sieves can be employed to separate straight chain hydrocarbons from branched chain hydrocarbons because the straight chain materials, which have diameters of less than 5 Angstroms, pass into the pores of the sieves, whereas branched-chain compounds, which have diameters greater than 5 Angstroms, are not adsorbed. Also, sieves having large pore sizes, such as 13X sieves, can be employed for the separation of compounds having a higher degree of unsaturation from those having a lower degree of unsaturation, such as olefins from paraffins, diolefins from monoolefins, acetylenes from olefins and the like.

One drawback to the use of molecular sieves for separation processes has been their tendency to catalyze the polymerization of various unsaturated organic compounds present in the streams to be treated, such as isobutylene, isoprene, butadiene, vinylacetylene and the like. The resulting polymers, which form on the surface or in the pores of the sieves, reduce the capacity of the sieve and are removed only with difficulty.

It has been found by this invention, however, that when a molecular sieve is treated with an organic compound containing oxygen in the form of a hydroxyl group or an ether linkage, the catalytic activity of the sieve is inhibited. The method by which the oxygen-containing compounds inhibit the catalytic activity of molecular sieves is not definitely known. It is postulated, however, that the molecular sieves have acidic sites due either (1) to the presence of exposed aluminum atoms on the surface of the zeolitic structure or (2) to the presence of hydrated cations on the surface. The former structure would act as a Lewis acid and the latter a Bronstead acid, both of which would tend to catalyze the polymerization of unsaturated compounds. The oxygen-containing inhibitors of this invention are believed to act as Lewis or Bronstead bases and neutralize the acidic sites. Regardless of the mechanism, however, it has been found that sieves containing the compounds disclosed herein have substantially reduced catalytic activity. By the term "containing", as employed in this application, is meant a molecular sieve having bonded thereto an inhibitor regardless of whether the bonding is physical or chemical in nature.

The polymerization inhibitors employed in accordance with this invention can be aliphatic alcohols, phenolic compounds, ethers of alcohols or phenols, or compounds of mixed functionality, provided they are otherwise inert in relation to the materials to be separated with the sieve. It is preferred, however, that the inhibitors consist solely of carbon, hydrogen and oxygen wherein the oxygen is present in the form of a hydroxyl group or an ether linkage, as represented by the general formula:

(I) XOY wherein X, when taken alone, is a monovalent organic radical composed of no atoms other than carbon, hydrogen or oxygen in the form of a hydroxyl group or an ether linkage; Y, when taken alone is hydrogen or X; X and Y, when taken together, form a divalent organic radical composed of no atoms other than carbon, hydrogen or oxygen in the form of a hydroxyl group or an ether linkage.

Subgeneric to the compounds of formula (I) are the hydroxyl-substituted hydrocarbons of the formula:

(II) R(OH)$_x$ wherein R is a hydrocarbon group having a valence of X and having from one to about 20 carbons; and $x$ is an integer having a value of from 1 to 2; and the ethers of the formula:

(III) 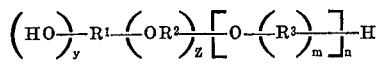

wherein y is an integer having a value of from 0 to 1; z is a positive integer preferably having a value of from 1 to about 20; m is an integer having a value of from 0 to 1; n is an integer having a value of from 0 to 1; R$^1$, when taken alone, is a hydrocarbon radical having a valence of 1+y, and preferably containing from one to about 20 carbon atoms; R$^2$, when taken alone, is a divalent hydrocarbon radical preferably containing from one to about 20 carbon atoms; R$^3$ is a divalent hydrocarbon radical preferably containing from one to about 20 carbon atoms; and R$^1$ and R$^2$, when taken together, form a radical having a valence of 3+y and consisting of hydrogen, at least two carbon atoms and preferably less than 20 carbon atoms, and no more than one oxygen atom, said radical forming a heterocyclic ring with the oxygen atom having from 5 to 6 ring members in which any two oxygen atoms are separated by at least one carbon atom.

Particularly preferred classes of ethers are the heterocyclic ethers represented by the formula:

(IV) 

wherein Z is a divalent group consisting of no atoms other than carbon, hydrogen and oxygen which, when taken with the oxygen atom, forms a heterocyclic compound of from five to six ring members, said ring members being carbon atoms and from one to two oxygen atoms, said compound containing from three to 20 carbons and from 1 to 2 oxygen atoms in the form of ether linkages; and the aliphatic acyclic ethers of the formula:

(V) 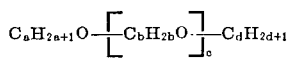

wherein a is an integer having a value of from 0 to about 10; b is an integer having a value of from 2 to 3; c is an integer having a value of from 0 to about 20; and d is an integer having a value of from 0 to about 10; with the proviso that when c has a value of 0 each of a and d has a value of at least 1 and when c ahs a value of 1 at least one of a and d has a value of at least 1.

As examples of suitable polymerization inhibitors one can mention methanol, ethanol, hexanol, 2-ethylhexanol, decanol, pentadecanol, eiscosanol, allyl alcohol, 2-ethylidene-1-heptanol, benzyl alcohol, 3-phenyl-3-heptanol, α-vinylbenzyl alcohol, 2-phenyl-4-penten-2-ol, β-ethylphenethyl alcohol, 3-phenyl-4-octanol, cyclohexanol, 2,5-endomethylenecyclohexene-1-methanol, ethylene glycol, 1,3-butanediol, 2,2-diethyl-1,3-propanediol, 1,5-naphthalene dimethanol, 1,2,6-hexanetriol, phenol, 1-naphthol, 2-naphthol, 4-nonylphenol, 4-indanol, phenanthrol, 1-pyrenol, 10-phenyl-9-phenanthrol, 1,3-naphthalenediol, resorcinol, dimethyl ether, diethyl ether, diisopropyl ether, di-2-ethylhexyl ether, diphenyl ether, dinaphthyl ether, benzyl phenyl ether, dicyclopropyl ether, vinyl allyl ether, 1,3-dioxole, 1,3-dioxolane, 2-ethyl-2-methyl-1,3-dioxolane, furan, tetrahydrofuran, 1,3-dioxin, 1,3-dioxane, 1,4-dioxane, pyran, tetrahydropyran, 2-ethoxy-4-methyltetrahydropyran, monomethyl ether of ethylene glycol, mono-2-ethylhexyl ether of ethylene glycol, monobenzyl ether of ethylene glycol, α-phenylfurfuryl alcohol, 4-(p-hydroxyphenyl)2-butanol, methoxyphenol, methoxycresol, 3-(ethoxymethyl)-2,4,6-trimethylphenol, dimethyl ether of ethylene glycol, dibutanol, dibutyl ether of ethylene glycol, vinyl butoxyethyl ether, diethylene glycol and its mono and di ethers, trimethylene glycol and its mono and di ethers, pentaethylene glycol and its mono and di ethers, propylene glycol and its mono and diethers, dipropylene glycol and its mono and diethers, and the like.

The preferred polymerization inhibitors are those having sufficiently low vapor pressures to avoid their removal during the use of the treated sieve. In particular, compounds which have vapor pressures in excess of 760 mm. Hg. at 20°C. should be avoided. Compounds having vapor pressures of less than about 200 mm. Hg. at 20°C. are preferred.

The treatment of this invention is effected by drying the sieve to remove water, such as by heating the sieve at about 300° to 350°C., and then impregnating the sieve with a polymerization inhibiting amount of oxygen-containing compound. The impregnation can be accomplished in any convenient manner, such as by passing a vapor stream of the inhibitor through the sieve, or immersing the sieve in a liquid inhibitor or a solution of the inhibitor in a non-polar volatile solvent such as benzene or toluene and thereafter evaporating off the excess inhibitor and/or solvent.

The polymerization inhibiting amount is not highly critical, and can vary widely, depending on the inhibitor employed and the severity of the conditions of the process in which the treated sieve is to be employed. In general, amounts of from 0.1 weight per cent up to about 40 or more weight per cent, based on the weight of the sieve, can be employed. It is preferred, however, to employ the least amount of inhibitor which will have an inhibiting effect because, although additional amounts provide no concomitant increase in inhibition, they will reduce the absorptive capacity of the sieve, particularly if the inhibitor has a sufficiently small diameter to pass into the pores of the sieve. Optimum amounts vary from 0.1 to 5 weight per cent in the case of ethers to from 3 to 10 per cent in the case of phenols.

The treated sieves can be employed for effecting separations by methods known to the art. For example, treated 5A sieves can be employed to separate an isobutylene/n-butene feed stream, and treated 13X sieves can be employed to remove vinylacetylene impurities from a butadiene stream.

The following examples are illustrative:

EXAMPLE I

One liter of 1/16-inch pellets of a 5A molecular sieve manufactured by the Linde Division of Union Carbide Corporation was dried by heating at 350°C. for 6 hours. After cooling to room temperature the sieves were thoroughly admixed with 300 cc. of dry isopropyl ether and the resulting mixture was evaporated to apparent dryness at a pressure of 15 mm. Hg. The treated sieves, weighing 658 grams, were charged to an adsorption column and a feed containing 53.1 per cent isobutene and 46.9 per cent butene-1 was fed at atmospheric pressure and 24°C. through the bed at a rate of one liter per minute. After one hour 59 grams of pure isobutene were recovered. After another hour 135 grams of a mixture of isobutene and butene-1 was recovered. The bed was then flooded with water to desorb the n-butene. No polymerization of isobutene was observed.

EXAMPLE II

In a manner similar to that described in Example 1, 1 liter of the molecular sieves was treated with 270 grams of furan and evaporated to dryness, leaving 0.58 weight per cent furan on the sieve. The treated sieve was then employed to separate a feed containing 51.2 per cent isobutene and 48.8 per cent butene-1. No polymerization of isobutene was observed.

EXAMPLE III

Six hundred seventy-one grams of 1/16-inch pellets of 5A molecular sieves were dried by heating at 350°C. for 8 hours. After cooling to room temperature, the sieves were thoroughly admixed with a solution of 45 grams of phenol in 300 cc. of toluene. The toluene was evaporated at room temperature and a pressure of 15 mm. Hg. The sieves, with added phenol, were placed in an adsorption column and a mixture containing 124 grams of isobutene and 140 grams of butene-1 was passed through the column. There were recovered 48 grams of 99.5 per cent isobutene, at which point the effluent became contaminated with butene-1. There were recovered 113 grams of mixed butenes containing 81 grams of isobutene and 32 grams of butene-1. Butene-1 was desorbed from the sieve by flooding the bed with water. No polymerization of the isobutene was observed.

EXAMPLE IV

In a manner similar to that described in Example 3, 51 grams of 1-naphthol were loaded on 665 grams of dry molecular sieves, and the treated sieves were employed to separate a gas stream containing 51.2 per cent isobutene and 48.8 per cent butene-1. No polymerization was observed.

EXAMPLE V

A sample of 1/16-inch pellets of a 13× molecular sieve manufactured by Linde Division of Union Carbide Corporation was heated at 350°C. for 4 hours to remove water and then immersed in isopropyl ether. After removal of excess ether by vacuum, and then heating at 20°C. for 4 hours, the treated sieves contained 1.88 weight per cent isopropyl ether. A 659-gram portion of the treated sieves was charged to a 37-mm. by 47-inch glass column, and butadiene, containing 930 ppm. vinylacetylene and less than 50 ppm. methylacetylene was fed at 25°C. and atmospheric pressure to the bottom of the bed a rate of 1.55 grams per minute. Butadiene, containing about 22 ppm. vinylacetylene, appeared in the effluent stream 60 minutes after starting the feed. The effluent remained at this composition until, at 800 minutes after starting the feed, the vinylacetylene content began to rise and reached 930 ppm. at about 1,050 minutes, at which time the feed was stopped. Desorption of the bed was effected by flooding with water. The results of this experiment are summarized in tabular form below, together with the results obtained from a similar experiment employing untreated 13× molecular sieves.

| | Sieve Bed | |
|---|---|---|
| | Isopropyl ether-treated | Untreated |
| Weight of bed, grams | 659 | 670 |
| Butadiene breakthrough | | |
|   Time, minutes | 60 | 80 |
|   Vinylacetylene, ppm. | 22 | 900 |
| Vinylacetylene breakthrough | | |
|   Time, minutes | 800 | 150 |
| Equilibrium | | |
|   Time, minutes | 1050 | 400 |
|   Total feed, grams | 1674 | 608 |
|   Total effluent, grams | 1552 | 470 |
|   Adsorbate, grams | 94 | 125 |
|   Polymer weight, grams | 25 | 120 |

From the above data it is clear that the treated sieve of this invention is superior to an untreated sieve for the removal of acetylene impurities from butadiene. Thus the treated sieve reduced the vinylacetylene concentration in the butadiene stream by over 97 per cent for a period of time which is over 5 times the period to vinylacetylene breakthrough with the untreated sieve. Moreover, the per cent of the feed which polymerizes is reduced from almost 20 per cent in the case of the untreated sieve to only 1.5 per cent for the treated sieve.

EXAMPLE VI

Employing apparatus and procedures similar to those described in Example 5, isopropanol is loaded on a 5A molecular sieve and the treated sieve is employed to separate isobutene from butene.

EXAMPLE VII

Employing apparatus and procedures similar to those described in Example 5, the monoethyl ether of ethylene glycol is loaded on a 5A molecular sieve and the treated sieve is employed to separate isobutene from butene.

WHAT IS CLAIMED IS:

1. The method for inhibiting the catalytic activity of a molecular sieve for the polymerization of unsaturated polymerizable organic compounds which comprises impregnating said molecular sieve with a polymerization inhibiting amount of a hydrocarbon phenolic compound having from 1 to 20 carbon atoms and from one to two hydroxyl groups.

2. The method for inhibiting the catalytic activity of a molecular sieve for the polymerization of unsaturated polymerizable organic compounds which comprises impregnating said molecular sieve with a polymerization inhibiting amount of phenol.

3. The method for inhibiting the catalytic activity of a molecular sieve for the polymerization of unsaturated polymerizable organic compounds which comprises impregnating said molecular sieve with a polymerization inhibiting amount of 1-naphthol.

4. The method for inhibiting the catalytic activity of a molecular sieve for the polymerization of unsaturated polymerizable organic compounds which comprises impregnating said molecular sieve with a polymerization inhibiting amount of a compound of the formula:

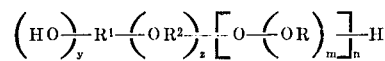

wherein $y$ is an integer having a value of from 0 to 1; $z$ is a positive integer; $m$ is an integer having a value of from 0 to 1; $n$ is an integer having a value of from 0 to 1; $R^1$, when taken alone, is a hydrocarbon radical having a valence of $1+y$ and containing from one to 20 carbons; $R^2$, when taken alone, is a divalent hydrocarbon radical containing from one to 20 carbons; $R^3$ is a divalent hydrocarbon radical containing from one to 20 carbons which can be the same as or different from $R^2$; and $R^1$ and $R^2$, when taken together, form a radical having a valence of $3+y$ and consisting of hydrogen, from two to 20 carbons and no more than one oxygen, which radical forms a heterocyclic ring with oxygen having from 5 to 6 ring members in which any two oxygens are separated by at least one carbon.

5. The method for inhibiting the catalytic activity of a molecular sieve for the polymerization of unsaturated polymerizable organic compounds which comprises impregnating said molecular sieve with a polymerization inhibiting amount of a heterocyclic ether of the formula

wherein Z is a divalent group having no atoms other than carbon, hydrogen and oxygen which, when taken with the oxygen atom, forms a heterocyclic compound of from five to six ring members, said ring members being carbon atoms and from one to two oxygen atoms, said compound containing from three to 20 carbon atoms and from one to two oxygen atoms.

6. The method for inhibiting the catalytic activity of a molecular sieve for the polymerization of unsaturated polymerizable organic compounds which comprises impregnating said molecular sieve with a polymerization inhibiting amount of furan.

7. The method for inhibiting the catalytic activity of a molecular sieve for the polymerization of unsaturated polymerizable organic compounds which comprises impregnating said molecular sieve with a polymerization inhibiting amount of a compound of the formula:

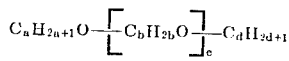

wherein a is an integer having a value of from 0 to 10; b is an integer having a value of from 2 to 3; c is an integer having a value of from 0 to 20; d is an integer having a value of from 0 to 10; with the proviso that when c is 0 each of a and d has a value of at least 1 and when c is 1 at least one of said a and d has a value of at least 1.

8. The method for inhibiting the catalytic activity of a molecular sieve for the polymerization of unsaturated polymerizable organic compounds which comprises impregnating said molecular sieve with a polymerization inhibiting amount of isopropyl ether.

9. The method for inhibiting the catalytic activity of a molecular sieve for the polymerization of unsaturated polymerizable organic compounds which comprises impregnating said molecular sieve with a polymerization inhibiting amount of the monoethyl ether of ethylene glycol.

10. As an article of manufacture, a molecular sieve containing a polymerization inhibiting amount of a hydrocarbon phenolic compound having from one to 20 carbon atoms and from one to two hydroxyl groups.

11. As an article of manufacture, a molecular sieve containing a polymerization inhibiting amount of phenol.

12. As an article of manufacture, a molecular sieve containing a polymerization inhibiting amount of 1-naphthol.

13. As an article of manufacture, a molecular sieve containing a polymerization inhibiting amount of a compound of the formula:

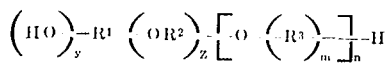

wherein y is an integer having a value of from 0 to 1; z is a positive integer; m is an integer having a value of from 0 to 1; n is an integer having a value of from 0 to 1; $R^1$, when taken alone, is a hydrocarbon radical having a valence of 1+y and containing from one to 20 carbons; $R^2$, when taken alone, is a divalent hydrocarbon radical containing from one to 20 carbons; $R^3$ is a divalent hydrocarbon radical containing from one to 20 carbons which can be the same as or different from $R^2$; and $R^{and\ R2}$, when taken together, form a radical having a valence of 3+y and consisting of hydrogen, from two to 20 carbons and no more than one oxygen, which radical forms a heterocyclic ring with oxygen having from five to six ring members in which any two oxygens are separated by at least one carbon.

14. As an article of manufacture, a molecular sieve containing a polymerization inhibiting amount of a hetero-cyclic ether of the formula

wherein Z is a divalent group having no atoms other than carbon, hydrogen and oxygen which, when taken with the oxygen atom, forms a heterocyclic compound of from five to six ring members, said ring members being carbon atoms and from one to two oxygen atoms, said compound containing from three to 20 carbon atoms and from one to two oxygen atoms.

15. As an article of manufacture, a molecular sieve containing a polymerization inhibiting amount of furan.

16. As an article of manufacture, a molecular sieve containing a polymerization inhibiting amount of a compound of the formula:

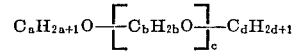

wherein a is an integer having a value of from 0 to 10; b is an integer having a value of from 2 to 3; c is an integer having a value of from 0 to 20; d is an integer having a value of from 0 to 10; with the proviso that when c is 0 each of a and d has a value of at least 1 and when c is 1 at least one of said a and d has a value of at least 1.

17. As an article of manufacture, a molecular sieve containing a polymerization inhibiting amount of isopropyl ether.

18. As an article of manufacture, a molecular sieve containing a polymerization inhibiting amount of monoethyl ether of ethylene glycol.

19. In a process for the separation of organic compounds with a molecular sieve by contacting said sieve with said compounds and removing an enriched component, the improvement of employing a molecular sieve containing a polymerization inhibiting amount of a hydrocarbon phenolic compound having from 1 to 20 carbon atoms and from 1 to 2 hydroxy groups.

20. In a process for the separation of organic compounds with a molecular sieve by contacting said sieve with said compounds and removing an enriched component, the improvement of employing a molecular sieve containing a polymerization inhibiting amount of phenol.

21. In a process for the separation of organic compounds with a molecular sieve by contacting said sieve with said compounds and removing an enriched component, the improvement of employing a molecular sieve containing a polymerization inhibiting amount of 1-naphthol.

22. In a process for the separation of organic compounds with a molecular sieve by contacting said sieve with said compounds and removing an enriched component, the improvement of employing a molecular sieve containing a polymerization inhibiting amount of a compound of the formula:

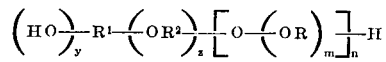

wherein y is an integer having a value of from 0 to 1; z is a positive integer; m is an integer having a value of from 0 to 1; n is an integer having a value of from 0 to 1; n is an integer having a value of from 0 to 1; $R^1$, when taken alone, is a hydrocarbon radical having a valence of 1+y and containing from 1 to 20 carbons, $R^2$, when taken alone, is a divalent hydrocarbon radical containing from 1 to 20 carbons; $R^3$ is a divalent hydrocarbon radical containing from 1 to 20 carbons which can be the same as or different from $R^2$; and $R^1$ and $R^2$, when taken together, form a radical having a valence of 3+y and consisting of hydrogen, from 2 to 20 carbons and no more than one oxygen, which radical forms a heterocyclic ring with oxygen having from 5 to 6 ring members in which any two oxygens are separated by at least one carbon.

23. In a process for the separation of organic compounds with a molecular sieve by contacting said sieve with said compounds and removing an enriched component, the improvement of employing a molecular sieve containing a polymerization inhibiting amount of a heterocyclic ether to the formula

wherein Z is a divalent group having no atoms other than carbon, hydrogen and oxygen which, when taken with the oxygen atom, forms a heterocyclic compound of from 5 to 6 ring members, said ring members being carbon atoms and from 1 to 2 oxygen atoms, said compound containing from 3 to 20 carbon atoms and from 1 to 2 oxygen atoms.

24. In a process for the separation of organic compounds with a molecular sieve by contacting said sieve with said compounds and removing an enriched component, the improvement of employing a molecular sieve containing a polymerization inhibiting amount of furan.

25. In a process for the separation of organic compounds with a molecular sieve by contacting said sieve with said compounds and removing an enriched component, the improvement of employing a molecular sieve containing a polymerization inhibiting amount of a compound of the formula:

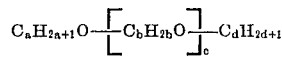

wherein a is an integer having a value of from 0 to 10; b is an integer having a value of from 2 to 3; c is an integer having a value of from 0 to 20; d is an integer having a value of from 0 to 10; with the proviso that when c is 0 each of a and d has a value of at least 1 and when c is 1 at least one of said a and d has a value of at least 1.

26. In a process for the separation of organic compounds with a molecular sieve by contacting said sieve with said compounds and removing an enriched component, the improvement of employing a molecular sieve containing a polymerization inhibiting amount of isopropyl ether.

27. In a process for the separation of organic compounds with a molecular sieve by contacting said sieve with said compounds and removing an enriched component, the improvement of employing a molecular sieve containing a polymerization inhibiting amount of the monoethyl ether of ethylene glycol.

28. The method for separating butadiene from vinyl acetylene which comprises contacting a mixture containing butadiene and vinyl acetylene in the vapor phase with a molecular sieve having a substantially uniform pore size of about 9 A and containing a polymerization inhibiting amount of a hydrocarbon phenolic compound having from one to 20 carbon atoms and from one to two hydroxyl groups and removing said butadiene.

29. The method for separating butadiene from vinyl acetylene which comprises contacting a mixture containing butadiene and vinyl acetylene in the vapor phase with a molecular sieve having a substantially uniform pore size of about 9 Angstroms and containing a polymerization inhibiting amount of phenol and removing said butadiene.

30. The method for separating butadiene from vinyl acetylene which comprises contacting a mixture containing butadiene and vinyl acetylene in the vapor phase with a molecular sieve having a substantially uniform pore size of about 9 Angstroms and containing a polymerization inhibiting amount of 1-naphthol and removing said butadiene.

31. The method for separating butadiene from vinyl acetylene which comprises contacting a mixture containing butadiene and vinyl acetylene in the vapor phase with a molecular sieve having a substantially uniform pore size of about 9 A and containing a polymerization inhibiting amount of a compound of the formula:

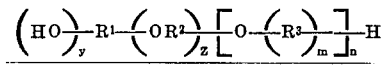

wherein y is an integer having a value of from 0 to 1; z is a positive integer; m is an integer having a value of from 0 to 1; n is an integer having a value of from 0 to 1; $R^1$, when taken alone, is a hydrocarbon radical having a valence of 1+y and containing from one to 20 carbons; $R^2$, when taken alone, is a divalent hydrocarbon radical containing from one to 20 carbons; $R^3$ is a divalent hydrocarbon radical containing from one to 20 carbons which can be the same as or different from $R^2$; and $R^1$ and $R^2$, when taken together, form a radical having a valence of 3+y and consisting of hydrogen, from 2 to 20 carbons and no more than one oxygen, which radical forms a heterocyclic ring with oxygen having from five to six ring members in which any two oxygens are separated by at least one carbon and removing said butadiene.

32. The method for separating butadiene from vinyl acetylene which comprises contacting a mixture containing butadiene and vinyl acetylene in the vapor phase with a molecular sieve having a substantially uniform pore size of about 9 A and containing a polymerization inhibiting amount of a heterocyclic ether of the formula

wherein Z is a divalent group having no atoms other than carbon, hydrogen and oxygen which, when taken with the oxygen atom, forms a heterocyclic compound of from five to six ring members, said ring members being carbon atoms and from one to two oxygen atoms, said compound containing from three to twenty carbon atoms and from one to two oxygen atoms and removing said butadiene.

33. The method for separating butadiene from vinyl acetylene which comprises contacting a mixture containing butadiene and vinyl acetylene in the vapor phase with a molecular sieve having a substantially uniform pore size of about 9 Angstroms and containing a polymerization inhibiting amount of furan and removing said butadiene.

34. The method for separating butadiene from vinyl acetylene which comprises contacting a mixture containing butadiene and vinyl acetylene in the vapor phase with a molecular sieve having a substantially uniform pore size of about 9 A and containing a polymerization inhibiting amount of a compound of the formula:

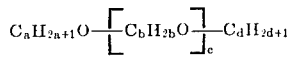

wherein a is an integer having a value of from 0 to 10; b is an integer having a value of from 2 to 3; c is an integer having a value of from 0 to 20; d is an integer having a value of from 0 to 10; with the proviso that when c is 0 each of a and d has a value of at least 1 and when c is 1 at least one of said a and d has a value of at least 1 and removing said butadiene.

35. The method for separating butadiene from vinyl acetylene which comprises contacting a mixture containing butadiene and vinyl acetylene in the vapor phase with a molecular sieve having a substantially uniform pore size of about 9 A and containing a polymerization inhibiting amount of isopropyl ether and removing said butadiene.

36. The method for separating butadiene from vinyl acetylene which comprises contacting a mixture containing butadiene and vinyl acetylene in the vapor phase with a molecular sieve having a substantially uniform pore size of about 9 Angstroms and containing a polymerization inhibiting amount of the monoethyl ether of ethylene glycol and removing said butadiene.

37. The method for separating isobutene from n-butene which comprises contacting a mixture containing isobutene and n-butene in the vapor phase with a molecular sieve having a substantially uniform pore size of about five A and containing a polymerization inhibiting amount of phenol and removing said isobutene.

38. The method for separating isobutene from n-butene which comprises contacting a mixture containing isobutene and n-butene in the vapor phase with a molecular sieve having a substantially uniform pore size of about 5 A and containing a polymerization inhibiting amount of 1-naphthol and removing said isobutene.

39. The method for separating isobutene from n-butene which comprises contacting a mixture containing isobutene and n-butene in the vapor phase with a molecular sieve having a substantially uniform pore size of about 5 and and containing a polymerization inhibiting amount of a compound of the formula:

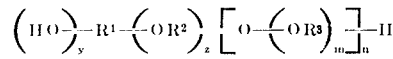

wherein y is an integer having a value of from 0 to 1; z is a positive integer; m is an integer having a value of from 0 to 1; n is an integer having a value of from 0 to 1; $R^1$, when taken alone, is a hydrocarbon radical having a valence of 1+y and containing from one to 20 carbons; $R^2$, when taken alone, is a divalent hydrocarbon radical containing from one to 20 carbons; $R^3$ is a divalent hydrocarbon radical containing from one to 20 carbons which can be the same as or different from $R^2$; and $R^1$ and $R^2$, when taken together, form a radical having a valence of 3+y and consisting of hydrogen, from two to 20 carbons and no more than one oxygen, which radical forms a heterocyclic ring with oxygen having from five to six ring members in which any two oxygens are separated by at least one carbon and removing said isobutene.

40. The method for separating isobutene from n-butene which comprises contacting a mixture containing isobutene and n-butene in the vapor phase with a molecular sieve having a substantially uniform pore size of about 5 A and containing a polymerization inhibiting amount of a heterocyclic ether of the formula

wherein Z is a divalent group having no atoms other than carbon, hydrogen and oxygen which, when taken with the oxygen atom, forms a heterocyclic compound of from five to six ring members, said ring members being carbon atoms and from one to two oxygen atoms, said compound containing from three to 20 carbon atoms and from one to two oxygen atoms and removing said isobutene.

41. The method for separating isobutene from n-butene which comprises contacting a mixture containing isobutene and n-butene in the vapor phase with a molecular sieve having a substantially uniform pore size of about 5 A and containing a polymerization inhibiting amount of furan and removing said isobutene.

42. The method for separating isobutene from n-butene which comprises contacting a mixture containing isobutene and n-butene in the vapor phase with a molecular sieve having a substantially uniform pore size of about 5 A and containing a polymerization inhibiting amount of a compound of the formula:

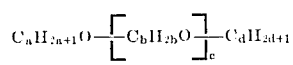

wherein $a$ is an integer having a value of from 0 to 10; $b$ is an integer having a value of from 2 to 3; $c$ is an integer having a value of from 0 to 20; $d$ is an integer having a value of from 0 to 10; with the proviso that when $c$ is each of a and d has a value of at least 1 and when $c$ is 1 at least one of said a and d has a value of at least 1 and removing said isobutene.

43. The method for separating isobutene from n-butene which comprises contacting a mixture containing isobutene and n-butene in the vapor phase with a molecular sieve having a substantially uniform pore size of about 5 A and containing a polymerization inhibiting amount of isopropyl ether and removing said isobutene.

44. The method for separating isobutene from n-butene which comprises contacting a mixture containing isobutene and n-butene in the vapor phase with a molecular sieve having a substantially uniform pore size of about 5 A and containing a polymerization inhibiting amount of the monoethyl ether of ethylene glycol and removing said isobutene.

* * * * *

UNITED STATES PATENT OFFICE
CERTIFICATE OF CORRECTION

Patent No. 3,683,592     Issue Date  August 15, 1972

Inventor(s) G. R. Kamm and C. H. Young

It is certified that error appears in the above-identified patent and that said Letters Patent are hereby corrected as shown below:

In column 8, line 10, "$R$ and $R^2$" should read -- $R^1$ and $R^2$ --.

In column 8, line 64, "hydroxy" should read -- hydroxyl --.

In column 12, line 8, the first "and" should read --

-- A --.

In column 14, beginning as line 11, add the following claim:

-- 45. The method for separating isobutene from n-butene which comprises contacting a mixture containing isobutene and n-butene in the vapor phase with a molecular sieve having a substantially uniform pore size of about 5 A and containing a polymerization inhibiting amount of a hydrocarbon phenolic compound having from 1 to 20 carbon atoms and from 1 to 2 hydroxyl groups and removing said isobutene. --

Signed and sealed this 20th day of March 1973.

(SEAL)
Attest:

EDWARD M. FLETCHER, JR.
Attesting Officer

ROBERT GOTTSCHALK
Commissioner of Patents